United States Patent [19]

Hantschk

[11] Patent Number: 4,907,906

[45] Date of Patent: Mar. 13, 1990

[54] PIN JOINT FOR ECCENTRIC WORM PUMPS

[75] Inventor: Günther Hantschk, Waldkraiburg, Fed. Rep. of Germany

[73] Assignee: Netzsch-Mohnopumpen GmbH, Fed. Rep. of Germany

[21] Appl. No.: 233,525

[22] Filed: Aug. 18, 1988

[30] Foreign Application Priority Data

Aug. 28, 1987 [DE] Fed. Rep. of Germany ....... 3728821

[51] Int. Cl.$^4$ ................................................ F16D 1/12
[52] U.S. Cl. .................................... 403/154; 403/145; 418/48
[58] Field of Search ............... 403/154, 155, 159, 157, 403/161, 166, 149, 145, 150, 152, 79, 100, 111, 229; 418/48; 464/113, 112, 134, 905

[56] References Cited

U.S. PATENT DOCUMENTS

| 2,165,619 | 7/1939 | Doeg | 403/145 X |
| 2,422,327 | 6/1947 | Winslow | 403/152 |
| 2,620,505 | 12/1952 | Rappl | 403/111 X |
| 3,307,486 | 3/1967 | Lindberg | 418/48 |
| 3,324,801 | 6/1967 | Fernholtz | 418/48 |
| 4,443,165 | 4/1984 | Chanton | 418/48 |

FOREIGN PATENT DOCUMENTS

| 2738945 | 3/1979 | Fed. Rep. of Germany | 418/48 |
| 2945858 | 7/1980 | Fed. Rep. of Germany | 418/48 |
| 3000476 | 7/1981 | Fed. Rep. of Germany | . |

Primary Examiner—Randolph A. Reese
Assistant Examiner—Peter M. Cuomo
Attorney, Agent, or Firm—Kenyon & Kenyon

[57] ABSTRACT

Two pin joints, each mounted at a respective end of a coupling rod, each comprise an outer joint head including a cavity which is open at least in one axial direction as well as a diametral bore and an inner joint head disposed in the cavity and likewise including a diametral bore. A pin extends through both bores and is locked at the outer joint head by a pin retaining device. To accomplish that, the pin has two ends projecting radially out of the outer joint head and each formed with a notch transversely of the longitudinal direction of the pin. The pin retaining device is embodied by a helical spring supported at its one end in the two notches of the pin and at its other end on a shoulder. The shoulder preferably is formed at a sliding ring seal which seals the outer joint head against a housing member.

4 Claims, 1 Drawing Sheet

PIN JOINT FOR ECCENTRIC WORM PUMPS

BACKGROUND AND DISCUSSION OF THE INVENTION

The invention relates to a pin joint for eccentric worm pumps, comprising
an outer joint head including a cavity which is open at least in one axial direction as well as a diametral bore,
an inner joint head disposed in the cavity and likewise including a diametral bore,
a pin extending through both diametral bores, and
pin retaining means to lock the pin at the outer joint head.

Eccentric worm pumps are used frequently in the foodstuff industry because of their characteristic protective conveyance. Conventional eccentric worm pumps, however, have the disadvantage of not leading themselves to cleaning as easily as centrifugal or rotary piston pumps because of their more complicated internal structure. This applies particularly in case of cleaning according to the so-called CIP process (cleaning in place) which must be effected at short intervals for hygienic reasons. With this process a cleansing agent is flushed at high flow rate through the pumps and conduits connected to them, without dismantling them. Areas particularly difficult to clean are those of seals between structural members which are interconnected so as to be disasembled and/or movable with respect to each other in operation. For this reason the joints which usually are provided at both ends of a coupling rod between the drive shaft and the rotor of an eccentric worm pump mainly are designed as open pin joints without any sealing if the pumps are destined for the foodstuff industry.

For instance, DE-A No. 1 528 935 discloses an eccentric worm pump with which two pin joints of the type described initially are arranged at one end each of a tie rod between the drive shaft and the rotor. In each of these joints the pin is formed with a thread at either end, receiving a nut in threaded engagement. The provisions for the design of machinery used in the foodstuff industry, such as the "3A Standard" which is applicable in the U.S.A., do not allow the utilization of threads in the conveying medium. Exceptions exist only for threads having certain rather big radii of curvature which cannot be observed in the case of a joint pin.

Likewise known are pin joints for eccentric worm pumps, for example from DE-B No. 1 278 842, with which the pin is retained by a sleeve which is slid on the outer joint head. The sleeve abuts by its one end on a shoulder of the outer joint head, while its other end is locked against axial displacement by a resiliently caught retaining ring (Seeger circlip). With this design, narrow gaps between the joint head, the sleeve, and the retaining ring are unavoidable so that the design as such is not suitable for cleaning according to the CIP process. The pin joints each are enclosed by a protective sleeve to prevent the material being conveyed from entering into the pin joints. These protective sleeves are made of elastic material and are tightly fixed at the coupling rod between the drive shaft and the rotor, on the one hand, and at the drive shaft or rotor, respectively, on the other hand. Even if they should remain tight, these fixing arrangements present areas which are difficult to clean and exclude cleaning by the CIP process. Therefore, the protective sleeve must be removed and cleaned separately from the associated pin joint if the cleaning is to be at least halfway through. This is an extremely time consuming procedure.

It is, therefore, an object of the invention to design a pin joint of the type specified initially such that it can be cleaned thoroughly in little time and is well suited above all for cleaning according to the CIP process.

This object is met, in accordance with the invention, in that
the pin has two ends projecting radially out of the outer joint head and each formed with a notch transversely of the longitudinal direction of the pin, and
the pin retaining means comprises a helical spring supported at its one end in the two notches formed in the pin and at its other end on a shoulder which is not displaceable in axial direction with respect to the outer joint head.

The two notches formed in the pin may be radiussed such that they can be cleaned easily. Likewise easy to be cleaned is the helical spring, especially by flushing with a cleansing liquid, because of the typical spacing between the individual windings of such a spring. Furthermore, it is easy to disassemble the pin joint, if need be, by pressing the the helical spring away from the joint pin and then pulling out the pin.

In the case of the eccentric worm pump according to DE-A No. 1 528 835 mentioned above, a sliding ring seal is arranged around the drive shaft, it has one portion fixed to the housing and a cup-shaped seal portion which rotates together with the drive shaft thereof. A helical spring is clamped between the latter portion and a shoulder remote from the pin and formed in the outer joint head to press the cup-shaped seal portion against the seal portion which is fixed to the housing. The helical compression spring does not contribute to retain the joint pin.

In accordance with a further development of the invention, by contrast, the shoulder supporting the helical spring which rests on the pin at its other end, is formed at a sliding ring seal which effects sealing between the outer joint head and a housing member.

BRIEF DESCRIPTION OF THE DRAWINGS

The invention will be described further, by way of example, with reference to the accompanying drawings, in which.

DETAILED DESCRIPTION OF THE PREFERRED EMBODIMENT

Figure 1:
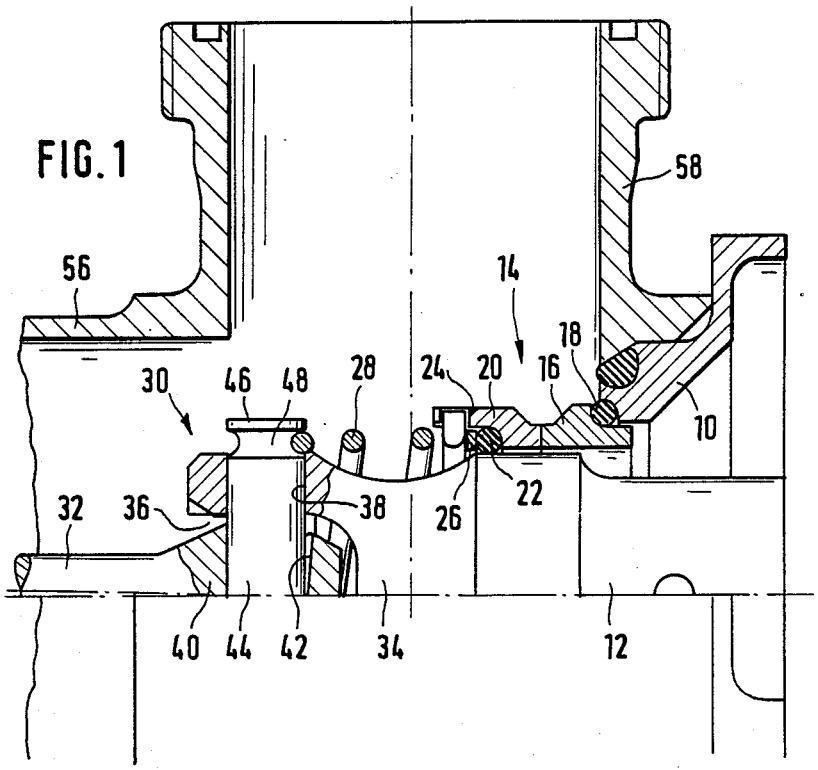
FIG. 1 is a view, partly in axial section, of a first pin joint and neighboring elements of an eccentric worm pump.

FIG. 1 indicates a bearing housing 10 in which a drive shaft 12 is journalled in conventional manner (not shown). The drive shaft 12 is sealed with respect to the housing 10 by a sliding ring seal 14 which comprises a stationary slide ring 16, an O-ring 18 disposed between the slide ring and the housing member 10, and a slide ring 20 which is rotatable together with the drive shaft, as well as an O-ring 22 disposed between the latter slide ring and the drive shaft 12.

The slide ring 20 is formed with a shoulder 24; an intermediate ring 26 is arranged radially inside of that shoulder. The shoulder 24 supports the terminal winding of a helical spring 28 which, at the same time, keeps the intermediate ring 26 abutting against the O-ring 22. The helical spring 28 is designed as compression spring and wound around a pin joint 30. The pin joint 30 connects the drive shaft 12 to a coupling rod 32 which must carry out movements on a cone shell surface upon rotation of the drive shaft 12. The pin joint 30 comprises a fork-shaped outer joint head 34 formed with a cavity 36 which is open in a direction away from the drive shaft 12 and in two opposed radial directions and which has a diametral bore 38. A solid inner joint head 40 is received in the cavity 36 and likewise has a diametral bore 42.

A cylindrical pin 44 passes through both bores 38 and 42, and its ends 46 both project radially out of the outer joint head 34, each being formed with a notch 48 in the form of an annular groove which has an approximately semi-circular cross section. The helical spring 28 is supported in the two notches 48 by its terminal winding which is remote from the sliding ring seal 14. Hereby the helical spring 28 is biased such that, on the one hand, it keeps the slide ring 20 in sealing face-end engagement with the slide ring 16 and, on the other hand, prevents any displacement of the pin 44 in the longitudinal direction of the pin.

Figure 2:
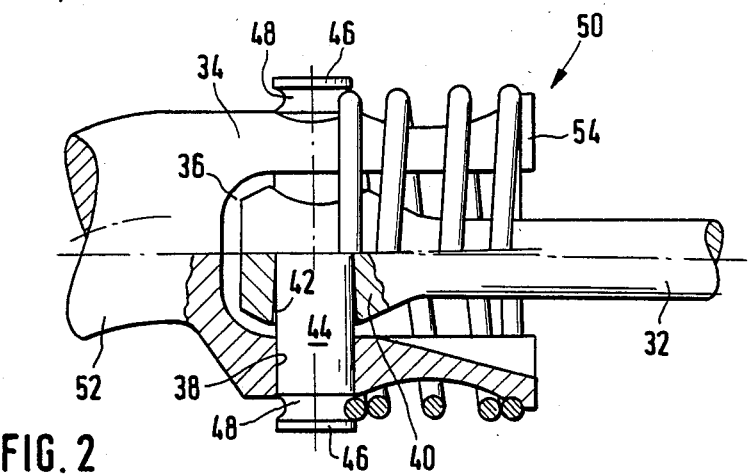
FIG. 2 is a similar view, partly in axial section, of the second pin joint belonging to the same eccentric worm pump.

The coupling rod 32 connects the pin joint 30 shown in FIG. 1 with a second pin joint 50 which is shown in FIG. 2 and substantially designed like the first pin joint 30. Corresponding structural members of both pin joints are marked by the same reference numerals.

The outer joint head 34 of the second pin joint 50 is made integrally with a rotor 52 and has an annular shoulder 54 at its end remote from the rotor. The helical spring 28 of the second pin joint 50 is clamped between the pin 44 of this joint and the shoulder 54.

The rotor 52 has the configuration of a one-start helical thread or worm and operates in a manner which is typical of eccentric worm pumps, in a stator (not shown) having an elastic inner lining in the form of a two-start hollow helical thread or worm. An intermediate housing 56 indicated in FIG. 1 is positioned between the stator and the rotor 52. It includes a connecting pipe end 58 which functions as the inlet or outlet, depending on the direction of rotation of the rotor 2. The stator, intermediate housing 56, and housing member 10 are clamped together detachably in conventional manner.

What is claimed is:

1. An eccentric worm pump, comprising
  a drive shaft having an axis or rotation;
  a rotor arranged for rotation about an axis of rotation common to said axis of rotation for said drive shaft;
  a pin joint for connecting said rotor to said drive shaft;
  said pin joint including
  an outer joint head including a cavity which is open at least in one axial direction as well as a first diametral bore,
  an innter joint head disposed in the cavity and including a second diametral bore,
  a pin extending through both first and second diametral bores,
  pin retaining means for locking the pin at the outer joint head,
  a shoulder fixed with respect to said outer joint head,
  the pin having two ends projecting radially out of the outer joint head and each end formed with a notch transversely of the longitudinal direction of the pin, and
  the pin retaining means comprising a helical spring having two spring ends supported at one spring end in the two notches formed in the pin and at the other spring end on the shoulder which is not displaceable in axial direction with respect to the outer joint head.

2. The eccentric worm pump as claimed in claim 1, further comprising a housing, a sliding ring seal which seals the outer joint head with respect to the housing, the shoulder being formed at the sliding ring seal.

3. The eccentric worm pump as claimed in claim 2, characterized in that each of the notches are annular grooves having an approximately semicircular cross section.

4. The eccentric worm pump as claimed in claim 1, characterized in that each of the notches are annular grooves having an approximately semicircular cross section.

* * * * *